United States Patent [19]
Kawata et al.

[11] Patent Number: 6,094,244
[45] Date of Patent: Jul. 25, 2000

[54] REFLECTIVE LIQUID CRYSTAL DISPLAY DEVICE

[75] Inventors: Yasushi Kawata; Hajime Yamaguchi, both of Kanagawa-ken; Takeshi Yamaguchi, Tokyo; Seizaburo Shimizu; Miki Mori, both of Kanagawa-ken; Yoshihisa Mizutani, Tokyo; Kohki Takatoh, Kanagawa-ken, all of Japan

[73] Assignee: Kabushiki Kaisha Toshiba, Japan

[21] Appl. No.: 08/773,972

[22] Filed: Dec. 26, 1996

[30] Foreign Application Priority Data

| Dec. 27, 1995 | [JP] | Japan | 7-341186 |
| Mar. 18, 1996 | [JP] | Japan | 8-060615 |
| Sep. 10, 1996 | [JP] | Japan | 8-238894 |

[51] Int. Cl.[7] .................................. G02F 1/1347
[52] U.S. Cl. ................................ 349/74; 349/76
[58] Field of Search ........................... 349/74, 76

[56] References Cited

U.S. PATENT DOCUMENTS

| 5,044,732 | 9/1991 | Kimura et al. ............ 359/53 |
| 5,155,608 | 10/1992 | Hatano ...................... 359/53 |
| 5,221,978 | 6/1993 | Heynderickx et al. ..... 359/53 |
| 5,437,811 | 8/1995 | Doane et al. .............. 252/299 |
| 5,453,863 | 9/1995 | West et al. ................ 359/91 |
| 5,801,796 | 9/1998 | Lowe ........................ 349/73 |

FOREIGN PATENT DOCUMENTS 7-287214  10/1995  Japan .

OTHER PUBLICATIONS

Heilmeier, George H., Joel E. Goldmacher, "A New Electric-Field-Controlled Reflective Optical Storage Effect In Mixed-Liquid Crystal Systems", Applied Physics Letters, vol. 13, No. 4, American Institute of Physics, Aug. 15, 1968.

*Primary Examiner*—William L. Sikes
*Assistant Examiner*—Walter Malinowski
*Attorney, Agent, or Firm*—Finnegan, Henderson, Farabow, Garrett & Dunner, L.L.P.

[57] ABSTRACT

The present invention of reflective liquid crystal display device include in: substrate having a surface; a pixel electrode on the surface; a first liquid crystal layer provided on the substrate; a second liquid crystal layer provided on the first liquid crystal layer; a counter electrode formed on the second liquid crystal layer; and a separating member provided between the first liquid crystal layer and the second liquid crystal layer. The first and second liquid crystal layers constituted by liquid crystal material having Bragg reflection(selective reflection in the same twist direction. The separating layer constituted optical compensator.

8 Claims, 11 Drawing Sheets

REFLECTIVE LIQUID CRYSTAL DISPLAY DEVICE

BACKGROUND OF THE INVENTION

1. Field of Invention

The present invention relates to a reflective liquid crystal display device.

2. Description of the Related Art

In recent years, active matrix type liquid crystal display devices have been developed and provided. The active matrix type liquid crystal display comprises electrodes on the substrates divided into individual pixels in which voltage is supplied to these pixel electrodes by providing switching devices such as thin-film transistors (TFTs) for each pixel Such liquid crystal display devices include called twisted nematic liquid display devices (TNLCD), surface stabilized ferroelecrics liquid crystal display devices (SSFLCD), and anti-ferroelectrics liquid crystal display devices (AFLCD) in which changeover can be effected between a light condition and a dark condition by using a polarizing plate, by utilizing the change of optical properties of the liquid crystal material. However, since a polarizing plate is an essential constituent of a liquid crystal display device hang such a display mode, its optical utilization efficiency is at most about 50%.

George H Heilmeier, and Joel E Goldmacher (Appl Phys. Lett. 13 (1968)have proposed a display mode called a selective reflective mode, using a cholesteric liquid crystal material, in which light having a specific wavelength is selectively reflected (Bragg reflection) by the complex twisted structure of the liquid crystal material. In this mode, optical switches by changing a transparent condition to a dispersion (or weak dispersion) condition. The transparent condition appear because reflection of optical wavelengths other than in the visible light region is produced in a planar structural condition. The planar structural condition is that the helical axis is aligned practically perpendicularly to the device substrate faces. Then the dispersion (or weak dispersion) condition produced in a focal conic structural condition. The focal conic structural condition is that the helical axis is practically parallel to the substrate surfaces.

This mode makes possible display of comparatively high contrast, since display is performed by means of a viable light region transparent condition in planar condition and by means of a weakly dispersive transmitting condition in focal conic condition. However, regarding the reflection efficiency with the planar structure, since only a specific wavelength region of clockwise or anti-clockwise circular wave is reflected, the reflection rate has a limiting value of 50%.

One system for getting the reflectivity above 50% in this mode is described in Early Japanese Patent Publication No. H7-287214. In this system, a clockwise rotatory polymeric dispersion type cholesteric liquid crystal (PDCLC) layer that selectively reflects only clockwise circular wave and a anti-clockwise rotatory PDCLC layer that selectively reflects only anti-clockwise circular wave are clamped between a set of substrates formed with transparent electrodes. With this system, reflectivity of substantially better than 50% might be expected since both anti-clockwise and clockwise circular wave can be reflected. However, because of the polymeric dispersion type structure, it is difficult to control precisely the matrix condition in order to form a twisted structure. Also, the drive voltage is raised by the formation of a mixed condition with the polymer. In particular, there is the problem that, in the case of a material of high threshold value, due to the twisted structure of the liquid crystal material, an extremely large voltage is required for driving purposes.

A further problem with this system is that contrast can't be increased, since light is dispersed when the light is transmitted. In addition to the comparatively high drive voltage is required.

SUMMARY OF THE INVENTION

The present invention was made after consideration of the above problems. Its object is to provide a reflective liquid crystal display device having a high reflectance and a high light utilization efficiency.

Further object of this invention is to provide a liquid crystal display of low drive voltage.

In order to achieve the above objects, the present invention provides a reflective liquid crystal display device comprising: a substrate having a surface; a pixel electrode on the surface of the substrate; a first liquid crystal layer provided on the substrate; a second liquid crystal layer provided on the first liquid crystal layer; a counter electrode formed on the second liquid crystal layer, and a separating member provided between the liquid crystal layer and the second liquid crystal layer; wherein the first and the second liquid crystal layers comprise liquid crystal material having Bragg reflection (selective reflection) in the same twist direction; wherein the separating layer comprises an optical compensator.

The present invention provides a reflective liquid crystal display device comprising: a substrate having a surface; a pixel electrode on the surface of the substrate; a first liquid crystal layer provided on the substrate; a second liquid crystal layer provided on the first liquid crystal layer, a counter electrode formed on the second liquid crystal layer, and a separating member provided between the first liquid crystal layer and second liquid crystal layer, wherein the first and the second liquid crystal layers comprise non-polymer liquid crystal material having Bragg reflection (selective reflection) and having respectively the opposite twist direction.

The present invention provides a reflective liquid crystal display device wherein the first liquid crystal layer comprise liquid crystal material having a twist pitch p1 and the second liquid crystal layer comprise liquid crystal material having a twist pitch p2; and wherein the separating member offset by about $\lambda/2$ the phase of the ordinary optical component and extraordinary optical component of light of wavelength width $\Delta n'.p2$ (where $\Delta n'$ is the optical anisotropy of the liquid crystal material of the second liquid crystal layer: $\Delta n'=ne-no$)having a selected reflected wavelength center value $\lambda'=n'.p2$ (n' is a mean refractive index of the liquid crystal material in the second liquid crystal layer in the direction of propagation of the light.)

The present invention provides a reflective type liquid crystal display device wherein: the difference $\Delta\lambda$ of the Bragg reflection (selective reflection) center wavelength $\lambda1$ of the liquid crystal material of the first liquid crystal layer and the Bragg reflection (selective reflection) center wavelength $\lambda2$ of the liquid crystal material of the second liquid crystal layer satisfied 30 nm<$\Delta\lambda$<100 nm.

The present invention provides a reflective type liquid crystal display device wherein: the separating member has a thickness of 1 $\mu$m or less and is constituted of a material that can transit light having a wavelength of 400 nm to 650 nm.

The present invention provides a reflective liquid crystal display device wherein: the first liquid crystal layer comprises chiral nematic liquid crystal material and the second liquid crystal layer comprises chiral nematic liquid crystal material; the first liquid crystal layer and the second liquid crystal layer reflecting a same direction circular wave.

The present invention provides a reflective liquid crystal display device wherein: the first liquid crystal layer comprises chiral nematic liquid crystal material and the second liquid crystal layer comprises chiral nematic liquid crystal material; the first liquid crystal layer and the second liquid crystal layer reflects a opposite direction circular wave.

The present invention provides a reflective liquid crystal display device further comprising: a first electrode formed on a face of the separating member facing the first liquid crystal layer; and a second electrode formed on a surface of the separating member facing the second liquid crystal layer; wherein the first electrode and second electrode are electrically connected through a through-hole provided in the separating member.

The present invention provides a reflective liquid crystal display device wherein: the separating member has anisotropic electrical conducting characteristics in thickness.

The present invention provides a reflective liquid crystal display device wherein: the chiral nematic liquid crystal material is a mixed liquid crystal of nematic liquid crystal and chiral substance containing cholesteric liquid crystal, and light of wavelength 350 nm to 650 nm is reflected by the twisted structure of the liquid crystal.

The present invention provides a reflective liquid crystal display device wherein: the twist direction of the chiral nematic liquid crystal material constituting the first liquid crystal layer and the twist direction of the chiral nematic liquid crystal material constituting the second liquid crystal layer are the same, and the phase compensator changes the circular wave has passed through the second liquid crystal layer to the other direction.

The present invention provides a reflective type liquid crystal display device wherein the separating member is constituted by clamping the optical film between glass substrates which are formed stuck together.

The present invention provides a reflective liquid crystal display device wherein the first and the second electrodes formed on the separating member are formed for each pixel and are mutually electrically independent of other pixels, and are in floating condition with no input/output of electrical charge.

The present invention provides a reflective liquid crystal display device in which the surface area of the first and second electrodes is respectively the same or different.

The present invention provides a reflective liquid crystal display device wherein the surface area of the second electrode is larger than the surface area of the first electrode.

The present invention provides a device comprising: a first liquid crystal layer; a second liquid crystal layer provided on the first liquid crystal layer; and a separating member provided between the first liquid crystal layer and the second liquid crystal layer; wherein the first and the second liquid crystal layers comprising liquid crystal material having Bragg reflection (selective reflection) in the same twist direction; wherein the separating layer comprises an optical compensator.

Additional objects and advantages of the invention will be set forth in the description which follows, and in part will be obvious from the description, or may be learned by practice of the invention. The objects and advantages of the invention may be realized and obtained by means of the instrumentality and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

A preferred mode for putting this invention into practice is explained below. However, this is no more than a practical example for purposes of explanation of the invention, which can be employed modified in various ways.

A chiral nematic liquid crystal comprising of chiral material, for example a mixture of cholesteric material and nematic liquid crystal can serves as the liquid crystal material of the resent invention. The liquid crystal material isn't mixture with polymer material matrix. Also, the chiral nematic liquid crystal is obtained by introducing preferably 30% to 50% of chiral agent to the nematic liquid crystal. It is also possible less than 30% of the chiral agent, depending on its self-coiling pitch.

Light of wavelength 350 to 650 nm can be reflected with the chiral nematic liquid crystals. Furthermore, addition of perfluoroalkyl compounds etc., in a proportion of 1 to 3 weight %, to such a chiral nematic liquid crystal is beneficial in widening the range of selectable reflection wavelengths.

Example substrate materials in the liquid crystal display device of the present invention include glass substrate, transparent resin substrate, or heat-resistant resin substrate etc.

In the liquid crystal display device of the present invention, resin balls distributed on the substrate surface may serves as spacers. It is also desirable to form insulating pillars with prescribed separation on the substrate surface since these can be uniformly distributed over the surface and there is no risk of such spacers contacting each other when the substrates are assembled.

In the present invention, the Bragg reflection of the present invention is a selective reflection which the liquid crystal material reflects a light projected parallel to the axis of twist (helical axis) of the liquid crystal material in a planar structure. The light is divided into two circular wave, namely, a clockwise circular wave and anti-clockwise circular wave. One of these lights being transmitted, while the other is totally reflected with the liquid crystal layer of the invention. Accordingly, direction of the circular wave is reflected with a liquid crystal material having same direction of the circular wave selectively.

In the present invention, in case of the first liquid crystal layer in the first cell and the second liquid crystal layer in the second cell have mutually different selective reflection, for example if the first liquid crystal layer in the first cell reflect clockwise circular and the second liquid crystal layer reflect anti-clockwise, it is desirable that the separating member arranged between the first cell and the second cell should not have any optical rotatory power. Such the structure reflect a light effectively.

Figure 19:
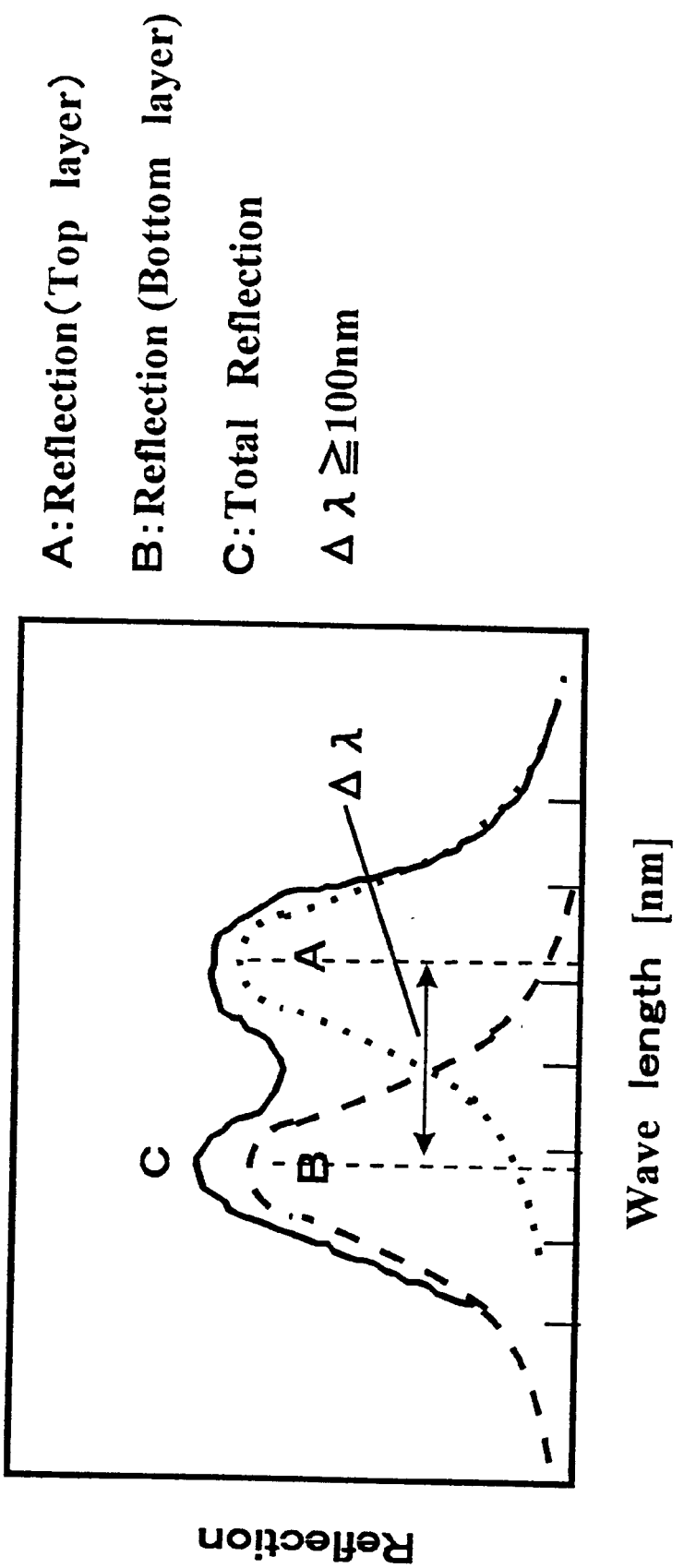
FIGS. 19(*a*) and 19(*b*) are graphs about reflection and wave length.
Figure 19:
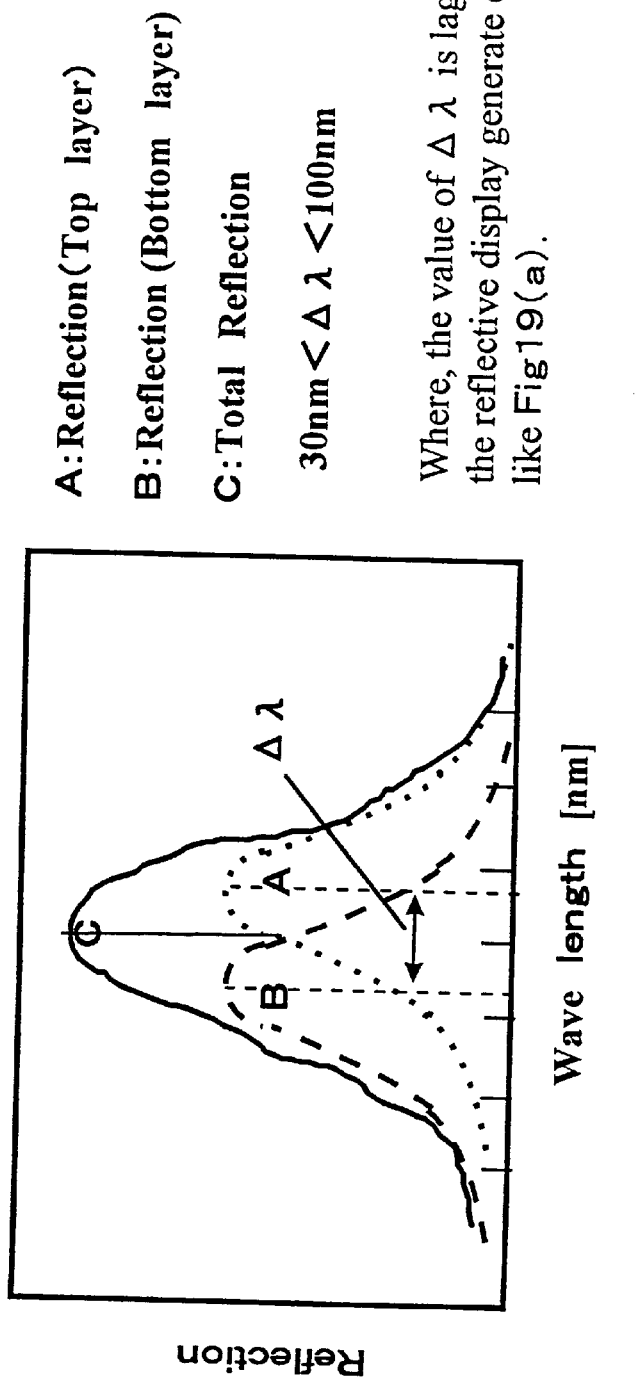

The wavelength of reflected light profiles with the liquid crystal layers can be respectively the same. But it is better that the central wavelengths of selective reflection (Bragg reflection) of the respective liquid crystal layers differ by about 30 to 100 nm since selective reflection has a wide wavelength range. Therefore it is desirable to make the difference $\Delta\lambda$ between the selective reflection central wavelength $\lambda 1$ of the first liquid crystal layer and the selective reflection central wave length $\lambda 2$ of the second liquid crystal layer such that 30 nm$<\Delta\lambda<$100 nm (See FIG. 19). If the value of $\Delta\lambda$ is lager than 100 nm, the reflective wavelengths have dual peak reflection, then it is not desirable that the display is colored in dual color.

In the present invention, in case of the first liquid crystal layer in the first cell and of the second liquid crystal layer have the same selective reflection, for example if the first and the second liquid crystal layers both reflect clockwise circular wave or both reflect anti-clockwise circular wave, it is desirable that the separating member arranged between the first cell and the second cell should have optical rotatory power. The separating member convert the circular wave after passage through the first cell from clockwise to anti-clockwise or from anti-clockwise to clockwise.

In this case, it is desirable that the separating member should be an optical compensator having the function of displacing by about $\lambda/2$ the phases of the ordinary optical component and extraordinary optical component of the light of wavelength width $\Delta n'.p2$ (where $\Delta n'$ is the optical anisotropy of the second liquid crystal layer in the second cell) having a selective reflection wavelength center value $\lambda'=n'.p2$ determined by the mean refractive index n' and the twist pitch p2 of the second liquid crystal layer in the second cell of the first and second cells in the direction of propagation.

In the present invention, it is desirable that the thin-film material used in the separating member should not allow permeation or passage of liquid crystal molecules and should be an electrically insulating material that does not have solubility for the liquid crystal maternal examples the thin film may be made of polyimide, polyamide, or polyamic acid.

Also, as the material of the film showing optical rotatory power, high refractive index material such as polymeric liquid crystal material or inorganic material etc. having the same refractive index as this can be applied. From the point of view of flexibility, it is desirable that the thin film should be an organic thin film. Also, talking into account gas insulating characteristics, it is desirable that a very thin film coating of inorganic insulating material should be applied on top of the organic tin film. In particular, an inorganic thin film showing flexibility is ideal.

Taking into account parallax at the two (upper and lower) liquid crystal layers, the thickness of the thin film should be preferably less than 1 $\mu$m. A thin film having this thickness and consisting of the above material can transmit well light having a wavelength of 400 to 650 nm.

Also, the thin film is formed by a water-surface expansion film laminated film of films of thickness about 100 Angstrom).

The thin film will form two or more regions when a cell is assembled with a pair of substrates by pushing on to the substrates with spacers. Specifically, spacers are provided on the respective opposite surfaces of the pair of substrates, the thin film is inserted, and the respective substrates are arranged facing each other. By this means, the cells are divided into regions in the film thickness direction by the thin film being pressed on by means of the spacers formed on the respective substrates.

In this case, the total of the depths of the various regions (thickness of the liquid crystal layers) represents the substrate depth D. For example, if the thin film partite liquid crystal cell into two regions in thickness, if the depths of these respective regions (thickness of the liquid crystal layers) are taken to be D1 and D2, since the thickness of the thin film is small, we have D1+D2=D (which is a fixed value). Consequently, uniformity of picture quality can be maintained without the appearance of well-defined boundaries between each region.

It should be noted that these two or more regions are constituted by a region containing liquid crystal material reflecting a clockwise optical circular wave and a region containing liquid crystal material reflecting an anti-clockwise optical circular wave each other.

It should be noted that these two or more regions are constituted by a region containing liquid crystal material reflecting same direction of circular wave. In this case the thin film has optically rotated power.

In the present invention, in contrast to the conventional method of manufacturing a liquid crystal display device, the cells are assembled with spacers distributed on both substrates of the pair of substrates. This is done not only with the object of maintaining a fixed substrate spacing by means of the spacers but also with the object that spaces will automatically be formed wherein the thin film is supported in such a manner that the space is divided into two or more regions and in which the liquid crystal material is independently held.

Figure 1:
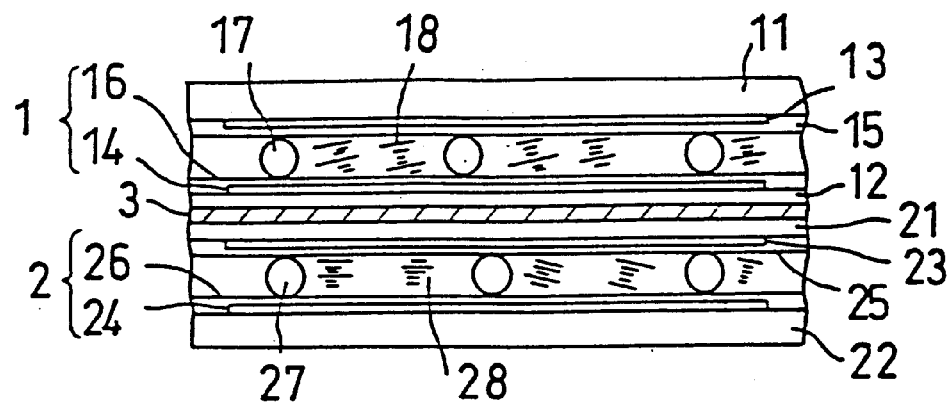
FIG. 1 is a cross-sectional view showing one embodiment of the reflective liquid crystal display device of the present invention.

Next, the detailed construction of a liquid crystal display device according to the present invention will be explained. First of all, a first embodiment of the present invention is illustrated in FIG. 1. This liquid crystal display device is essentially constituted by a first cell 1, second cell 2, and a separating member 3 interposed between first cell 1 and second cell 2.

First cell 1 is manufactured by: forming electrode layers 13, 14 comprising of conductor material or semiconductor material etc. such as ITO or Al on the pair of transparent substrates 11, 12 respectively. First cell 1 is manufactured by forming alignment films 15, 16 on electrode layers 13, 14. First cell 1 is manufactured by distributing spacer balls 17 on at least one of the alignment films after performing prescribed alignment treatment on the respective alignment films 15, 16 as required First cell 1 is manufactured by arranging transparent substrates 11, 12 oppositely so that alignment films 15, 16 are facing each other. First cell 1 is manufactured by introducing liquid crystal material 18 having a clockwise twisted structure (selective reflection of clockwise circular wave) between transparent substrates 11, 12.

Also, second cell 2 is manufactured by: forming electrode layers 23, 24 comprising conductor material or semiconductor material etc. such as ITO or Al respectively on a pair of transparent substrates 21, 22; forming alignment films 25, 26 on electrode layers 23, 24; distributing spacer balls 27 in a density of 100 balls/mm$^2$ or less on at least one of the alignment films after performing prescribed alignment treatment on respective alignment films 25, 26; arranging transparent substrates 21, 22 oppositely such that alignment films 25, 26 are facing each other, and introducing liquid crystal material 28 which is of anti-clockwise twist structure (selective reflection of anti-clockwise circular wave) between transparent substrates 21,22.

It should be noted that it will be possible to form pillar-shaped spacers using the alignment film material in first and second cells 1 and 2 when forming alignment films 15, 16 or 25, 26. Also, as the alignment film material could be made of the polyimide, polyamic acid or surfactant etc. Furthermore it is preferable that the density of formation of the spacer balls or pillar-shaped spacers is no more than about 100 balls or spacers/mm$^2$.

As the separating member 3 may be constituted by sandwiching a glass layer or refractive index matching oil having optical rotatory power between the transparent substrates. In particular, a layer comprising refractive index matching oil is desirable because it prevents reflection etc. between the transparent substrates 12, 21 on either side of this layer.

In the liquid crystal display device having a construction as explained above, respective voltages are applied to the electrode layers 13, 14 of first cell 1 and to the electrode layers 23, 24 of second cell 2. Also, with this liquid crystal display device, since clockwise-reflection liquid crystal material is introduced into first cell 1, the anti-clockwise circular wave of the input light is passed, while the clockwise circular wave is reflected. Since anti-clockwise-reflection liquid crystal material is introduced into second cell 2, the clockwise circular wave of the input light is passed, while the anti-clockwise circular wave is reflected. Consequently, the anti-clockwise circular wave that is transmitted through first cell 1 is reflected by second cell 2. By this means, reflectivity, reflection luminance, and contrast can be increased. Also, the wavelength of the reflected and scattered right can be differed each cells, thereby enabling the range of reflected wavelengths to be set widely.

Next, a second embodiment of the present invention is described with reference to FIG. 2. This liquid crystal display device is chiefly constituted by a first cell 1, a second cell 2, and a separating member 4 that is interposed between first cell 1 and second cell 2.

The construction of the first and second cells 1 and 2 is the same as that shown in FIG. 1. However, regarding the liquid crystal material, liquid crystal material 18 of clockwise twisted structure (reflection of clockwise circular wave) is introduced into both first and second cells 1 and 2. Alternatively, it would be possible to introduce liquid crystal material 28 of anti-clockwise twisted structure (reflection of anti-clockwise circular wave) into both first and second cells 1 and 2.

An optical compensator having optical rotatory power can be applied as separating member 4. This optical compensator alters the circular wave passing through first cell 1 into a circular wave that is capable of being reflected by second cell 2.

In the liquid crystal display device having a construction as explained above also, respective voltages are applied to electrode layers 13, 14 of first cell 1 and electrode layers 23, 24 of second cell 2. Also, in this liquid crystal display device, clockwise reflection liquid crystal material is introduced into first and second cells 1, so, of the input light, the anti-clockwise circular wave is passed, while the clockwise circular wave is reflected. The anti-clockwise circular wave that has passed through first cell 1 altered by separating member 4, into a clockwise circular wave. This clockwise circular wave is reflected by second cell 2. Reflectivity, reflection luminance and contrast can thereby be increased. Also, the wavelength of the reflected and scattered light can thereby be differed each sells, enabling the range of reflected wavelengths to be set widely.

Since in contrast with the case where laminated layers of chiral nematic liquid crystals having different circular wave reflection are applied, materials can be applied that reflect the same circular wave, the process for introduction of the liquid crystal material and adjustment of cell pitch etc. can be carried out easily.

Figure 3:
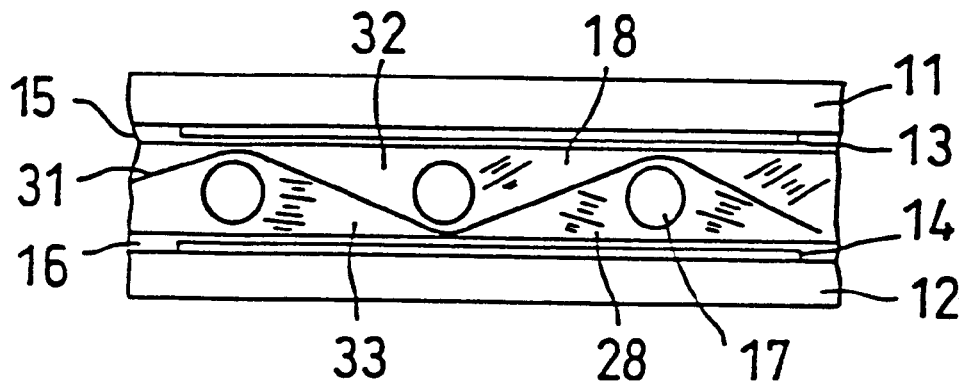
FIG. 3 is a cross-sectional view showing one embodiment of the reflective liquid crystal display device of the present invention.

A further liquid crystal display device construction according to the present invention will now be specifically explained. First of all, FIG. 3 shows an embodiment of the present invention. In this liquid crystal display device, electrode layers 13, 14 comprising conductor material or semiconductor material etc. comprising respectively of ITO and Al or the like are formed on a pair of transparent substrates 11, 12, and alignment films 15, 16 are formed on electrode layers 13, 14.

Next, after performing the prescribed alignment treatment as required on respective alignment films 15, 16, spacer balls 17 are distributed on the alignment films of both transparent substrates 11, 12.

Next, first and second regions 32, 33 are formed by arranging transparent substrates 11, 12 opposite such that alignment films 15, 16 face each other and thin film 31 is clamped between transparent substrates 11, 12.

The device is manufactured by introducing liquid crystal material 18 of clockwise twisted structure (reflection of clockwise circular wave) into first region 32 and introducing liquid crystal material 28 of anti-clockwise twisted structure (reflection of anti-clockwise circular wave) into second region 33.

When forming alignment films 15, 16, pillar-shaped spacers may be formed made of alignment film material. The alignment film material is made of polyimide, polyamic acid or surfactant etc. Also, it is preferable that the density of formation of spacer balls or pillar-shaped spacers should be no more than about 50 spacers/mm$^2$.

In a liquid crystal display device having a construction as above, voltage is applied to electrode layers 13, 14. Also, with this liquid crystal display device, clockwise circular wave reflection liquid crystal material 18 is introduced into first region 32, while anti-clockwise circular wave reflection crystal material 28 is introduced into second region 33. First region 32 and second region 33 are separated by means of thin film 31 comprising of a material through which the liquid crystal molecules cannot permeate or penetrate, so there is no mixture of clockwise circular wave reflection liquid crystal material 18 and anti-clockwise circular wave reflection liquid crystal material 28.

Consequently, in first region 32, of the incoming light, the anti-clockwise circular wave is passed, while the clockwise circular wave is reflected. And in the second region, the clockwise circular wave of the incoming light is passed whereas the anti-clockwise circular wave is reflected. As a result, the anti-clockwise circular wave that is passed by first region 32 is reflected by second region 33. By this means, reflectivity, reflection luminance, and contrast can be raised.

Also, by adjusting the magnitude of the voltage, the twist pitch can be altered and the wavelength of the light that is reflected and scattered can thereby be deferred each regions, enabling reflected wavelength to be set within a wide range.

Figure 4:
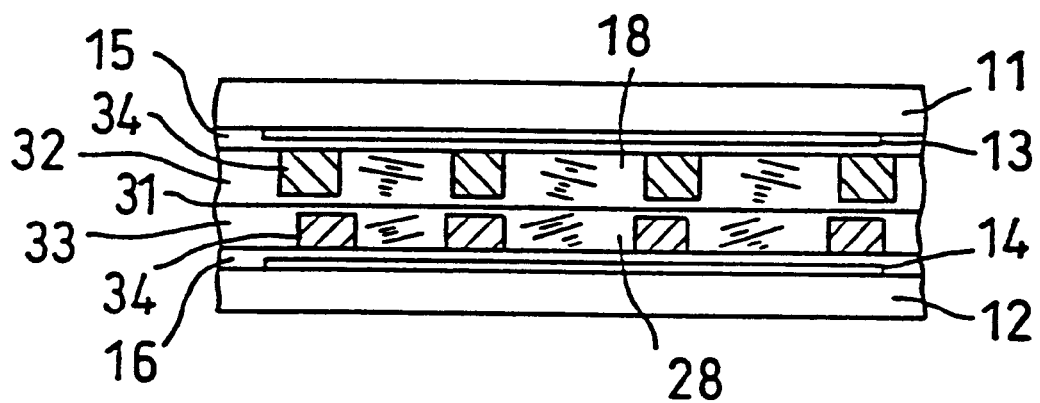
FIG. 4 is a cross-sectional view showing one embodiment of the reflective liquid crystal display device of the present invention.

Next, a further embodiment of this invention is illustrated in FIG. 4. In this liquid crystal display device, electrode layers 13, 14 respectively comprising of conductor material or semiconductor material such as ITO or Al etc. are formed on the pair of transparent substrates 11, 12. Next, alignment films 15, 16 are formed on electrode layers 13, 14 and, after performing the prescribed alignment treatment, as required, on the respective alignment films 15, 16, thin film 31 is clamped between transparent substrates 11, 12.

Next, first and second regions 32, 33 are formed by arranging transparent substrates 11, 12 oppositely so that alignment films 15, 16 face each other. The device is then manufactured by introducing liquid crystal material 18 of clockwise twisted structure (reflection of clockwise circular wave) into first region 32 and introducing liquid crystal material 28 of anti-clockwise twisted structure (reflection of anti-clockwise circular wave) into second region 33. In this case, spacer pillars 34 are formed when forming alignment films 15, 16. Also, the alignment film material is made of the polyimide, polyamic acid, or surfactants. Preferably the density of formation of the spacer pillars is less than about 100/mm$^2$.

In the liquid crystal display device constructed as above, voltage is applied to electrode layers 13, 14. Also, in this liquid crystal display device, liquid crystal material 18 of clockwise circular wave reflection is introduced into first region 32 while liquid crystal material 28 of anti-clockwise circular wave reflection is introduced into second region 33. First region 32 and second region 33 are divided by thin film 31 comprising of material that does not permit permeation or penetration of liquid crystal molecules, so liquid crystal material 18 and liquid crystal material 28 cannot mix.

Consequently, in first region 32, the anti-clockwise circular wave is passed, but the clockwise circular wave is reflected. And in the second region, the clockwise circular wave of the incoming light is passed but the anti-clockwise circular wave is reflected. As a result, the anti-clockwise circular wave that passes through first region 32 is reflected in second region 33. Reflectivity, reflection luminance and contrast can thereby be raised. Also, the wavelength of the light that is reflected and scattered can thereby be differed, so a wide range of reflected wavelength can be set.

Figure 5:
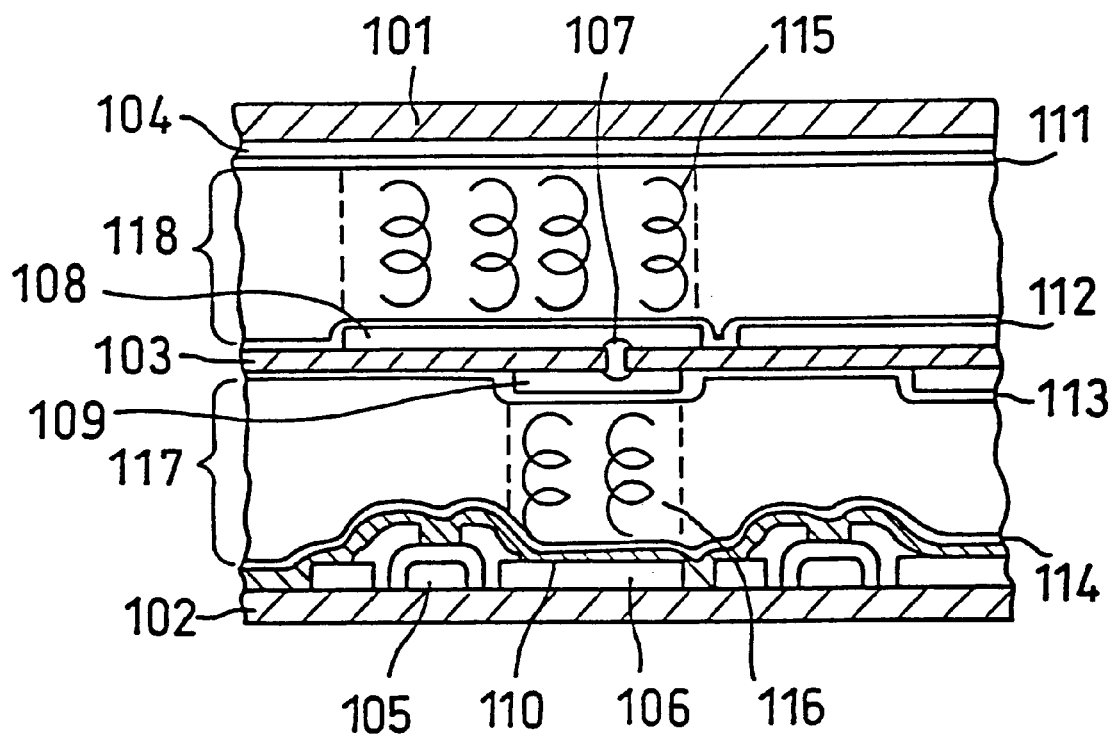
FIG. 5 is a cross-sectional view showing one embodiment of the reflective liquid crystal display device of the present invention.

FIG. 5 is a cross-sectional view of a reflective liquid crystal display device according to another embodiment of this invention. A pixel electrode 106 is formed on lower substrate 102 and this pixel electrode 106 is connected with a TFT 105 constituting a switching device. The entire surface of this pixel electrode 106 and TFT 105 are covered by light-absorbing material 110, so that light that is incident on these from above is completely absorbed in this part. On top of this lower substrate 102 there are formed, in that order, first liquid crystal layer 117 and second liquid crystal layer 118; on top of these, there is provided upper substrate 101, which is formed with a common electrode (counter electrode) 104.

Between first liquid crystal layer 117 and second liquid crystal layer 118, there is provided a separating member 103 that separates this first liquid crystal layer 117 and second liquid crystal layer 118. A first electrode 109 and second electrode 108 are formed on the faces of the separating member 103 respectively facing first liquid crystal layer 117 and second liquid crystal layer 118. The first electrode 109 and second electrode 108 are electrically connected by means of a through-hole 107 provided in the separating member 103.

Polyimide films 114, 111, 112, 113 may be provided as a uniform covering on the faces of the lower substrate 102, the upper substrate 101 and the separating member 103 respectively facing first and second liquid crystal layers 117 and 118, in order to stabilize the adhesion of the liquid crystal molecules; these polyimide films may be subjected to alignment treatment depending on the objective of use.

If alignment films are formed, it is even more preferable if pillar-shaped spacers are formed applying the same material as the alignment films in order to maintain a fixed cell depth. Also, resin spacer balls may be distributed by scattering them on the substrate surfaces. The density of these spacer balls is preferably no more than 100 balls/mm$^2$.

Between the respective liquid crystal molecules in these first and second liquid crystal layers 117 and 118, there are respectively clamped material 116 of anti-clockwise twisted structure and material 117 of clockwise twisted structure, so that light of a prescribed range of reflection wavelengths is reflected and scattered.

Also, separating layer 103 that is present between first liquid crystal layer and second liquid crystal layer 117 and 118 in this case is preferably of a material such as glass that does not show optical rotatory power, but could be of polymer film.

Also, if liquid crystal materials reflecting the same direction of circular wave are comprised for first and second liquid crystal layers 117 and 118, an optical filter that converts the direction of polarization of light to the opposite direction is provided as separating member between at least first liquid crystal layer 117 and second liquid crystal layer 118.

In this way, it becomes possible to achieve selective reflection of circular wave of both the clockwise and anti-clockwise directions of polarization. The efficiency of utilization of the light can thereby be raised.

In the present invention, a separating member 103 is provided between this first liquid crystal layer 117 and second liquid crystal layer 118, electrodes 109, 108 are provided on its surfaces facing the first and second liquid crystal layers, and these are connected by means of a through-hole 107. By this means, when voltage is applied between pixel electrode 106 and counter electrode 104, the voltage drop in the region of separating member 103 can be ignored, so power consumption can be reduced.

Figure 6:
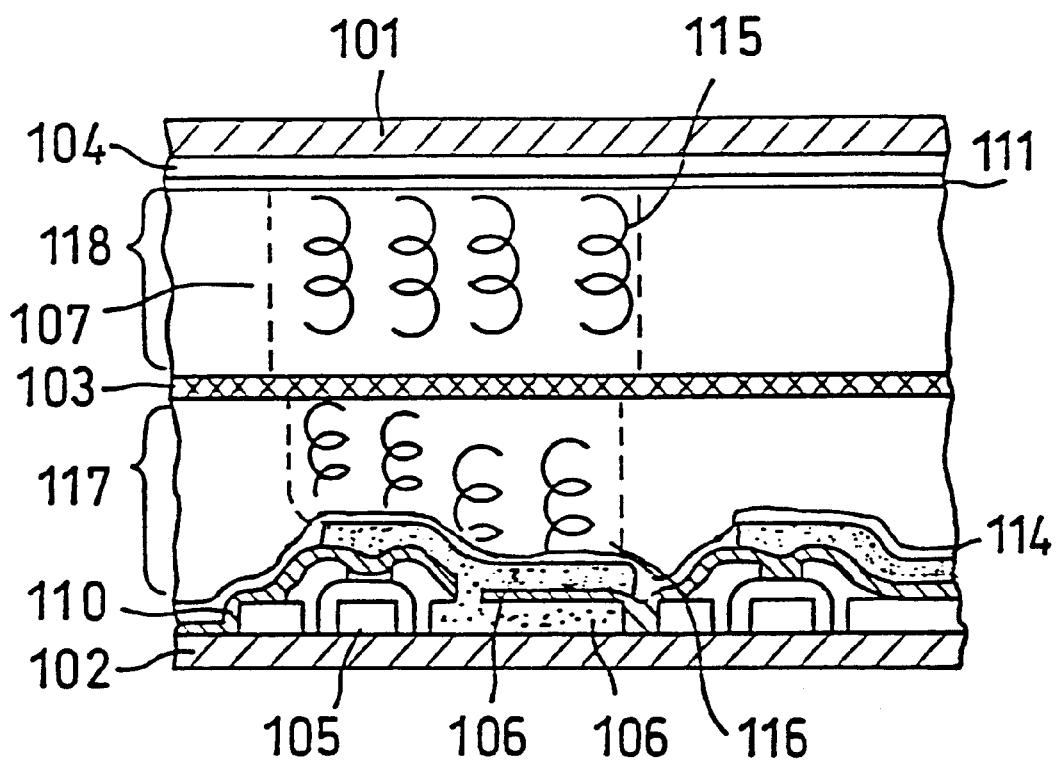
FIG. 6 is a cross-sectional view showing one embodiment of the reflective liquid crystal display device of the present invention.

Also, in the present invention, as shown in FIG. 6, separating member 103 may be formed of anisotropic electrically conductive film(ACF). In this case, identical parts are indicated by the same symbols as in FIG. 5 and detailed description thereof is omitted.

If anisotropic conductive film is applied for separating member 103 in this way, it is not necessary to make particular provision of electrodes 109, 108 such as are shown in FIG. 1; however, even if anisotropic conductive film is applied, it is still preferable to provide such electrodes 109, 108 because voltage can then be applied more uniformly.

Furthermore in FIG. 6, a pixel electrode 106 may be formed also on alignment film 114 with interposition of a contact hole. By doing this, the pixel electrode may be formed also on TFT 105, so the drive range of the liquid crystal can be made wider.

As the anisotropic conducting film provided in separating member 103, it is most effective to provide a conductive polymer. Examples that may be provided include polysilane, poly copper phthalocyanin, polyvinyl carbazole/trinitrofluorene, polyacetylene, polyphiothene, polypyrrhole, polyaniline, or polyarylene vinylene. In particular, polysilane or polyarylene vinylene etc. are suitable for producing anisotropic conductive characteristics in a film condition, since they can be made to assume two conditions, either conductive or insulating, by local exposure to ultraviolet light or by local heating by a YAG laser, for example.

Positive attempts to improve performance may also be made by, in order to improve electrical conductivity, providing the technique of doping a conductive semiconductor such as ITO after conversion to polysiloxane by local exposure to ultraviolet light of organic thin film consisting of polysilane film or the like.

Due to the presence of such anisotropic conducting film, a large voltage drop due to the intermediate layer can be avoided, since the capacitative components constituted by the first liquid crystal layer and second liquid crystal layer can be considered as practically an electrically series-connected capacitor.

This invention is characterized in that the liquid crystal material that is comprised in first liquid crystal layer 117 and second liquid crystal layer 118 is a mixed liquid crystal material with a chiral substance containing nematic liquid crystal and cholesteric liquid crystal, wherein, due to the twisted structure of this liquid crystal, light of wavelength 350 nm to 650 nm can be reflected. In this way, selective reflection over the visible light region can be achieved.

It is also possible to chiefly provide as the liquid crystal material a chiral nematic liquid crystal which is a mix of cholesteric liquid crystal and nematic liquid crystal. In order to stabilize the liquid crystal molecular alignment, it is beneficial to provide a composite liquid crystal material (Japanese Patent Application No. H7-341185), in which there is mixed with this chiral nematic liquid crystal 1 to 3% of a perfluoroalkyl compound-based material.

If liquid crystal materials that reflect circular wave of different directions are applied in first liquid crystal layer 117 and second liquid crystal layer 118, it is desirable that separating member 103 should not show optical rotation.

Regarding the wavelength profile of the light that is selectively reflected by first liquid crystal layer 117 and second liquid crystal layer 118, there are no problems if this is the same in these two regions. However, taking into account ease of visual recognition, if it is desired to obtain selective reflection with a wide wavelength range, it is desirable to make the central wavelengths of the selective reflection different by say 30 nm to 100 nm between these two regions.

On the other hand, if liquid crystal material that provides selective reflection of circular wave in the same direction is provided in both the first liquid crystal layer 117 and second liquid crystal layer 118, it is desirable that the separating member 103 should be formed of a material that does show optical rotation. In particular, in this case, it is desirable that the optical device should be capable of producing a phase difference of half a wavelength: $\lambda/2$ between the ordinary optical component and extraordinary optical component of the light, at a center wavelength $\lambda'=n'p$ (where n' is the mean refractive index of the liquid crystal and p is the twist pitch of the liquid crystal) of the light selectively reflected by second liquid crystal layer 118 and reflected wavelength width $\Delta\lambda=\Delta np$ which is thereby produced (where $\Delta n$ is the anisotropy of refractive index of the liquid crystal material of second liquid crystal layer 18).

As the spacer material to maintain the desired depth of the space constituting the liquid crystal layer (i.e. the cell gap) resin balls scattered on the surface of the substrate can be provided as conventionally but is preferable to use pillar-shaped insulators to form the prescribed spacing between the substrates.

(Embodiments)

Embodiments of this invention are explained in detail below with reference to the drawing.

(Embodiment 1)

Transparent electrodes of thickness 400 Angstrom were formed by sputtering ITO on to two glass substrates of thickness 0.7 mm. Next, polyimide (manufactured by Nippon Synthetic Rubber Inc., trade name Optoma AL-3046) was applied on to these transparent electrodes using a spinner and hardened to form an alignment film of thickness 70 nm. Epoxy resin adhesive was applied by the ordinary method at the portions where the glass substrates were to be stuck together.

Next, resin spacer balls of diameter 1.5 $\mu$m were scattered on to the alignment film with a density of under 100 balls/mm$^2$, and the epoxy resin adhesive portions of the two lass substrates were brought together and fixed with their alignment films facing each other thereby combining them to produce the cells. First and second cells were manufactured in this way.

Next, clockwise circular wave reflection first liquid crystal material was manufactured by mixing 59 weight % of nematic liquid crystal material (manufactured by Merck Inc., trade name E-48) and 41 weight % of chiral substance (manufactured by Merck Inc., trade name CB-15). Also, anti-clockwise circular wave reflection second liquid crystal material was manufactured by mixing 65 weight % of nematic liquid crystal material E-48 and 35 weight % of chiral substance (manufactured by Merck Inc., trade name S-811).

Next, the first and second liquid crystal materials were respectively introduced by the ordinary method into the first and second cells. Finally, a separating member 3 was formed by filling the space between the first cell and the second cell with matching oil having practically the same refractive index as glass, so as to decrease optical reflection of the glass interface that would be caused by the presence of an air layer (layer formed between the first cell and second cell). A liquid crystal display device according to this invention having the structure shown in FIG. 1 was thus manufactured.

The reflectivity and contrast of this liquid crystal display device were then examined. The results are shown in Table 1 below. Reflectivity and contrast were measured using a luminance meter (manufactured by Topcon Inc., trade name BM-7) arranged on the direction of the normal of the device, by projecting light from a halogen light source on to the front face of the cell. The voltage required for drive was then about 20 V.

(Embodiment 2)

First and second cells were manufactured in the same way as in embodiment 1.

Next, clockwise circular wave reflection first liquid crystal material was manufactured by mixing together 59 weight % of nematic liquid crystal material E-48 and 41 weight % of chiral substance CB-15. Also, clockwise circular wave reflection second liquid crystal material was manufactured by mixing together 61 weight % of nematic liquid crystal material E-48 and 39 weight % of chiral substance CB-15.

Next, the first and second liquid crystal materials were respectively introduced by the ordinary method into the first and second cells. Finally, between the first cell and second cell, there was clamped an optical compensating device capable of offsetting by $\lambda/2$ the phase difference between the ordinary component and extraordinary component of light of the selective reflection center wavelength (570 nm of the second liquid crystal material and light of the wavelength band accompanying this). In this way, a liquid crystal device according to this invention having the construction shown in FIG. 2 was manufactured.

The reflectivity and contrast obtained with this liquid crystal display device were examined in the same way as in embodiment 1. The results are shown together in Table 1 below. The voltage required for drive under these conditions was 18 V.

(Embodiment 3)

Transparent electrodes of thickness 400 Angstrom were formed by sputtering ITO on to two glass substrates of thickness 0.7 mm. Next, alignment films of thickness 70 nm were formed by applying polyimide Optoma AL-3046 on to the respective transparent electrodes applying a spinner, followed by hardening. Epoxy resin adhesive was applied by the ordinary method to the parts of the glass substrates to be stuck together.

Next, spacer balls made of resin of diameter 3 $\mu$m were scattered on to the alignment films with a density of less than 50 balls/mm$^2$. Next, tin film of film thickness 1 $\mu$m was formed by expanding a 10 weight % concentration polyamide acid solution on a water surface, and a cell was manufactured containing first and second regions by assembling the epoxy resin adhesive portions of the two glass substrates such that they were fixed facing each other with the alignment films facing each other and this thin film sandwiched between them.

Next, clockwise circular wave reflection first liquid crystal material was manufactured by mixing together 59 weight % of nematic liquid crystal material E-48 and 41 weight % of chiral substance CB-15. Also, anti-clockwise circular reflection second liquid crystal material was manufactured by mixing together 65 weight % of nematic liquid crystal material E-48 and 35 weight % of chiral substance S-811.

Next, the first and second liquid crystal materials were introduced by the ordinary method into the first and second regions of the cell respectively. In this way, a liquid crystal display device according to this invention having the construction shown in FIG. 3 was manufactured.

The reflectivity and contrast obtained with this liquid crystal display device were examined in the same way as in the case of embodiment 1. The results are shown together in Table 1 below.

(Embodiment 4)

Two glass substrates having transparent electrodes were manufactured in the same way as in embodiment 3. Next, alignment films of thickness 70 mm were formed by applying on to the respective transparent electrodes polyimide Optoma AL-3046 applying a spinner, followed by hardening. In addition, photosensitive polyimide (manufactured by Fuji Hunt Inc., trade name Probimide 412) was applied thereon applying a spinner and hardened to form a resist film of thickness 1.5 nm, which was then exposed and developed in a parallel exposure device applying a photomask, thereby forming spacer pillars of height 1.5 $\mu$m in the prescribed position. Epoxy resin adhesive was applied by the ordinary method to the places on the glass substrates to be stuck together.

Next, thin film of film thickness 1 $\mu$m was formed by expanding a polyamide add solution of concentration 10 weight % on a water surface, and a cell containing first and second regions was manufactured by bringing together epoxy resin adhesive portions of two glass substrates so as to fix them together with the alignment films facing each other and this thin film sandwiched between them.

Next, clockwise circular wave reflection first liquid crystal material was manufactured by mixing together 59 weight % of nematic liquid crystal material E- 48 and 41 weight % of chiral substance CB-15. Also, clockwise circular wave reflection second liquid crystal material was manufactured by mixing together 72 weight % of nematic liquid crystal material E-48 and 28 weight % of chiral substance S-811.

Next, the first and second liquid crystal materials were introduced by the ordinary method into the first and second regions of the cell. In this way, a liquid crystal display device according to this invention having the construction shown in FIG. 4 was manufactured.

The reflectivity and contrast obtained with this liquid crystal display device were examined in the same way as in the case of embodiment 1. The results are shown together in Table 1 below.

COMPARATIVE EXAMPLE

A cell was manufactured in the same way as in embodiment 1, and liquid crystal material was introduced into the cell by the ordinary method. In this case, as the liquid crystal material, an mixture of 60 weight % of E-48 and 40 weight % of CB-15 was applied. In this way, a conventional single-layer type liquid crystal display device was manufactured.

The reflectivity and contrast obtained with this liquid crystal display device were examined in the same way as in embodiment 1. The results are shown together in Table 1 below.

TABLE 1

Figure 2:
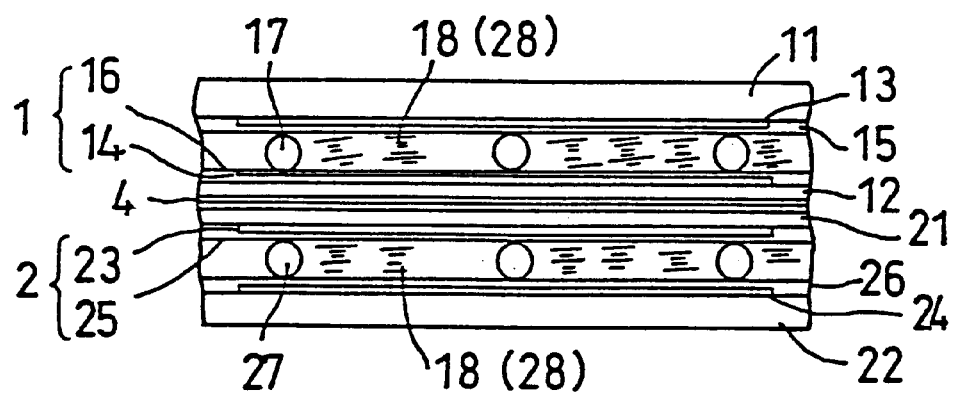
FIG. 2 is a cross-sectional view showing one embodiment of the reflective liquid crystal display device of the present invention.

| Device | structure | Reflectivity (%) | Contrast |
| --- | --- | --- | --- |
| Embodiment 1 | FIG. 1 | 65 | 55 |
| Embodiment 2 | FIG. 2 | 60 | 55 |
| Embodiment 3 | FIG. 3 | 60 | 55 |
| Embodiment 4 | FIG. 4 | 65 | 55 |
| Comparative example | Single layer | 37 | 30 |

As is clear from Table 1, the reflectivity and contrast of the liquid crystal display devices of this invention (embodiments 1 to 4) were both high. In contrast, the reflectivity and contrast obtained with the conventional liquid crystal display device (comparative example) were both low.

As explained above, a liquid crystal display device according to this invention is equipped with: a first cell in which there is held a first liquid crystal material reflecting a first direction of circular wave, between a pair of substrates; a second cell in which a second liquid crystal material reflecting a second direction of circular wave is held between a pair of substrates; and a separating member arranged between the first and second cells; also, it is equipped with: a pair of substrates; thin film comprising material that does not allow permeation or penetration of liquid crystal molecules and that divides the region between the pair of substrates into two or more regions in the width direction; and two or more liquid crystal materials respectively sealed into the regions demarcated by said thin film; as a result, it has high reflectivity and contrast and affords excellent display characteristics and ease of recognition.

(Embodiment 5)

As shown in FIG. 5, alignment film 114 constituted by polyimide (Optoma AL-3046: Manufactured by Nippon Synthetic Rubber Inc.) was cast by a spinner with a thickness of 70 nm on to the faces of glass substrate 102 that contact the liquid crystal material, these glass substrates being formed with TFT 105 and pixel electrodes 106 and being formed with black light-absorbing film 110 over their entire surface.

Next, in the same way as at the face of substrate 101 that contacts the liquid crystal material and which is formed with common electrode 104 over the entire surface there was cast an alignment film 111 constituted by polyimide (Optoma AL-3046: Nippon Synthetic Rubber Inc.) in a thickness of 70 nm.

Next, epoxy adhesive was applied at prescribed locations of substrates 101, 102 in order to stick together substrates 101 and 102.

Next, electrodes 108, 109 were formed by etching after sputtering deposition of ITO on both faces and obtaining electrical connection between the front and back faces by molten filling of bumps on to through holes 107. The through holes being formed by etching treatment at prescribed locations in a glass substrate constituting separating member 3.

Next, spacer balls made of resin of diameter 1.5 $\mu$m are scattered on the substrate surfaces such as to give a density of less than 100 balls/mm$^2$, and substrate 101, separating member 103 and substrate 102 are a assembled such that pixel electrode 106 and electrodes 109, 108 are superimposed.

For the liquid crystal material forming first liquid crystal layer 117, liquid crystal material is mixed 59 weight % of nematic liquid crystal material E-48 (manufactured by Merck Inc.) and 41 weight % of chiral material CB 15 (manufactured by Merck Inc.). And for the liquid crystal material forming the second liquid crystal layer 118, liquid crystal material is mixed nematic liquid crystal E-48 (manufactured by Merck Inc.) in the amount of 72 weight % and chiral substance S 811 (manufactured by Merck Inc.) in the amount of 28 weight %.

First liquid crystal layer 117 then selectively reflected clockwise circular wave while second liquid crystal layer 118 selectively reflected anti-clockwise circular wave. The necessary drive voltage was then 20 V.

(Embodiment 6)

As shown in FIG. 5, alignment film 114 constituted by polyimide (Optoma AL-3046: Nippon Synthetic Rubber Inc.) was cast in a thickness of 70 nm using a spinner on to the surface of glass substrate 102 that is in contact with the liquid crystal material and which is formed with TFT 105 and pixel electrode 106, a black light-absorbing film 110 being formed over the entire surface.

Next, alignment film 111 constituted by polyimide (Optoma AL-3046: Nippon Synthetic Rubber Inc.) was cast using a spinner in a thickness of 70 nm in like manner also on to the face of substrate 101 that contacts the liquid crystal material and that was formed with a common electrode 104, over its entire surface.

Epoxy adhesive was then applied at prescribed locations of substrates 101, 102 to stick together substrates 101, 102.

Next, through-holes 107 were formed by etching treatment at prescribed locations in a resin substrate constituting separating member 103 and electrical connection was obtained between the front and back surfaces of this member by molten filling, constituting bumps, on the through-holes. Electrodes 108, 109 were then formed by sputter deposition of ITO on both faces, followed by etching. For this separating member 103 is constituted by a resin substrate capable of offsetting thereby by approximately $\lambda/2$ the phases of the ordinary light component and extraordinary light component of the corresponding wavelength region with the selected reflection center wavelength of 570 nm of the second liquid crystal layer 118. In this case, this separating member 103 converts clockwise circular wave passing through it to anti-clockwise circular wave and converts anti-clockwise circular wave passing through it to clockwise circular wave.

Next, resin spacer balls of diameter 1.5 μm were scattered on the substrate surfaces in a density of 100 balls/mm² or less, and substrate 101, separating member 103 and substrate 102 were combined such that pixel electrode 106, electrode 109 and electrode 108 were superimposed.

The liquid crystal material in fast liquid crystal layer 117 was mixed 59 weight % of nematic liquid crystal material E 48 (made by Merck Inc.) and 41 weight % of chiral substance CB 15 (made by Merck Inc.). The liquid crystal material in the second liquid crystal layer 118 was mixed 61 weight % of nematic liquid crystal E 48 (made by Merck Inc.) and 39 weight % of chiral substance CB 15 (made by Merck Inc.).

In this case, the first liquid crystal layer 117 selectively reflects clockwise circular wave and the second liquid crystal layer 118 selectively reflects clockwise polar wave that has been compensated to turn it from anti-clockwise circular wave by means of phase compensator formed in the separating layer. The necessary drive voltage in this case was 18 V.

Table 2 shows the display performance of liquid crystal display devices of embodiments 5 and 6 manufactured as above. For comparison, the display characteristic of a display device of single-layer construction, that does not have an independent multiple-layer construction, is also shown.

TABLE 2

| Device | Reflective (%) | Contrast |
|---|---|---|
| Embodiment 5 | 65 | 55 |
| Embodiment 6 | 60 | 55 |
| Comparative example | 37 | 30 |

(Embodiment 7)

As shown in FIG. 6, photosensitive polyimide (Probimide 412 made by Fuji Hunt) was deposited in a thickness of 2 μm on the face contacting the liquid crystal material of a glass substrate 102 which was formed with TFT 105, pixel electrode 106, and, over its entire surface, a black, light-absorbing film 110 (photo sensitive black-resin:CK-6020L, Fuji Hant technology).

Next, after pre-baking this substrate, exposure was conducted through a photomask using a parallel exposure device (Nikon: PLA-501), followed by developing and rinsing steps to form pillars serving as spacers.

Next, alignment film 114 constituted by polyimide (Optoma AL-3046: Nippon Synthetic Rubber Inc.) was cast on to this substrate in a thickness of 70 nm using a spinner.

Next, alignment film 111 constituted by polyimide (Optoma AL-3046: Nippon Synthetic Rubber Inc.) was cast in a thickness of 70 mn applied by a spinner in the same way on to the face of substrate 101 that contacts the liquid crystal material and which is formed with common electrode 104, over its entire surface.

Next, epoxy adhesive was applied at prescribed locations of substrates 101, 102 to stick together the substrates 101, 102.

Next, separating member 103 constituted by thin film having anisotropic electrical conduction characteristics was manufactured. In this case, the anisotropic electrical film was constituted by the polysilane illustrated below.

[Chemical formula 1]

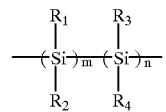

In this formula, R1, R2, R3 and R4 are groups that may be respectively independently selected from the group consisting of H substituted or unsubstituted aliphatic hydrocarbon radicals, alicyclic hydrocarbon radicals, and aromatic hydrocarbon radicals, and n and m are integers.

This polysilane is dissolved in organic solvent and applied in a thickness of 20 μm on to a suitable substrate by the spin coating method. Ethanol was as the solvent.

Next, a transparent conductive film (ITO) was formed in a thickness of 100 nm on the surface of the thus-formed polysilane film by the sol gel method. After this, patterns of 5 μm×5 μm square were produced on this polysilane film with a separation of 5 μm using a photomask.

In this process, it is desirable to make the amount of ultraviolet radiation projected on to the polysilane film about 1 to 10 J/cm². The portions that are exposed by this treatment are converted into porous polysiloxane. After exposure, the porous polysiloxane portions were doped with ITO by annealing at 80 to 120° C. Next, an anisotropic conductive film can be formed by removing the ITO remaining in the surface by etching treatment. The difference in the resistance values of this anisotropic conductive film in the film thickness direction and film planar direction was then about $10^{6}$.

An assembled cell was then constructed of substrate 101, separating member 103 comprising of the anisotropic conductive film manufactured in this step, and substrate 102.

The liquid crystal material constituted by first liquid crystal layer 117 was mixed 59 weight % of nematic liquid crystal material E 48 (manufactured by Merck Inc.) and 41 weight % of chiral substance CB 15 (manufactured by Merck Inc.). For the liquid crystal material constituted by the second liquid crystal layer 118 was mixed 72 weight parts of nematic liquid crystal E 48 (made by Merck Inc.) and 28 weight % of chiral substance S-811 (made by Merck Inc.).

First liquid crystal layer 117 selectively reflects clockwise circular wave, while second liquid crystal layer 118 selectively reflects anti-clockwise circular wave. The necessary drive voltage in this case was about 30 V.

(Embodiment 8)

As shown in FIG. 6, photosensitive polyimide (Probimide 412: manufactured by Fuji Hunt) was deposited in a thickness of 1.5 μm on the face of glass substrate 102 that contacts the liquid crystal material and is formed with TFT 105, pixel electrode 106, and, over its entire surface, black light-absorbing film 110.

Next, after pre-baking this substrate, it was exposed through a photomask in a parallel exposure device (Nikon: PLA-501) and development and rinsing steps performed to form pillars to serve as spacers.

Next, under this substrate there was cast using a spinner an alignment film 114 of polyimide (Optoma AL-3046: Nippon Synthetic Rubber Inc.) in a thickness of 70 mn.

Next, alignment film 111 constituted by polyimide (Optoma AL-3046, Nippon Synthetic Rubber Inc.) was cast by a spinner in a thickness of 70 nm in the same way over the entire surface of the face of substrate 101 that contacts the liquid crystal material and which was formed with common electrode 104.

Next, epoxy adhesive was applied at prescribed locations of substrates 101, 102 in order to stick substrates 101, 102 together.

Next, separating member 103 constituted by thin film having anisotropic electrically conductive characteristics was manufactured. This was formed constituted by the polysilane film indicated in formula (1). This polysilane was dissolved in organic solvent and spread out on a suitable substrate whereon laminated thin film was formed with thickness of 20 μm of monomolecular form having directionality on a suitable water surface using the LB method. Ethanol was solvent.

Transparent conductive film (ITO) was formed in a thickness of 100 nm by the sol gel method on the surface of the polysilane film formed in this way. Next, patterning of 5 μm×5 μm square was performed on the polysilane film with separations of 5 μm, using a photoresist.

In this process, the amount of ultraviolet light directed on to the polysilane film is preferably about 1 to 10 J/cm$^2$. The portions that are exposed to light are converted by this treatment into porous polysiloxane.

The porous polysiloxane parts were doped with ITO by annealing at 80 to 120° C. after the first exposure by the action of this phase difference plate. Next, anisotropic electrically conducting film was formed by removing the ITO remaining at the surface by etching treatment.

The difference in the resistance values in the film thickness direction and the film surface direction of this anisotropic electrically conducting film was then about $10^6$.

Next, a cell was produced by assembling substrate 101, separating member 103 consisting of anisotropic electrically conducting film manufactured by the above step and substrate 102.

The liquid crystal material forming first liquid crystal layer 117 is mixed 59 weight % of nematic liquid crystal material E 48 (made by Merck Inc.) and 41 weight % of chiral substance CB 15 (made by Merck Inc.). The liquid crystal material forming the second liquid crystal layer 18 is mixed 72 weight % of nematic liquid crystal E 48 (made by Merck Inc.) and 28 weight % of chiral substance S-811 (made by Merck Inc.). Table 3 shows the display characteristics of liquid crystal display devices according to embodiments 7 and 8 manufactured as above. For comparison, it also shows the display characteristics of a display device of single-layer structure not having independent multi-layer structure. The voltage required for drive in this case was 32 V.

TABLE 3

| Device | Reflective (%) | Contrast |
|---|---|---|
| Embodiment 7 | 65 | 55 |
| Embodiment 8 | 60 | 55 |
| Comparative example | 37 | 30 |

As shown in FIG. 5, there is the problem that if, in the first liquid crystal layer 117, there is present a region which is not formed with an electrode 109 e.g. the region above TFT 105, the liquid crystal molecules present in this portion of first liquid crystal layer 117 do not change their direction when voltage is applied, so the light cannot be controlled. The presence of such portions is undesirable from the point of view of the display characteristic.

Figure 7:
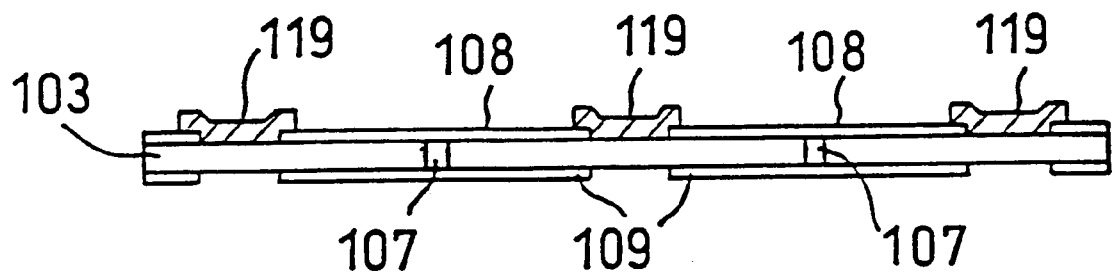
FIG. 7 is a cross-sectional view of various steps given in explanation of the process of forming a separating member employed in the reflective liquid crystal display device of the invention.

Accordingly, as shown in FIG. 7, it is desirable to form a black insulating layer pattern 119 in such portions where electrodes 108, 109 are not formed, so as to hide such portions optically. This pattern may be formed between the lower electrodes 109.

In this connection, in order to form a black insulating layer pattern 119, it is necessary to fully cover the space between adjacent electrodes 108, and, in order to guarantee sufficient margin for purposes of positional alignment, it would be necessary to provide an overlap portion of a few microns width on one side between electrode 108 and black insulating layer pattern 119. In order to reduce pixel area, it would be desirable to make this overlap portion as small as possibly can be managed. In fact it is preferable to have no such overlap portion and to form the black insulting layer pattern 119 in exact fit between the electrodes. Accordingly, a method is described below whereby this black insulating layer pattern 119 is formed in exact fit in self-aligned manner between electrodes 108.

FIG. 8 to FIG. 16 are cross-sectional views of intermediate layer 103 in the various steps of a method of forming a black insulating layer pattern 119 as described above in self-aligned fashion.

Figure 8:
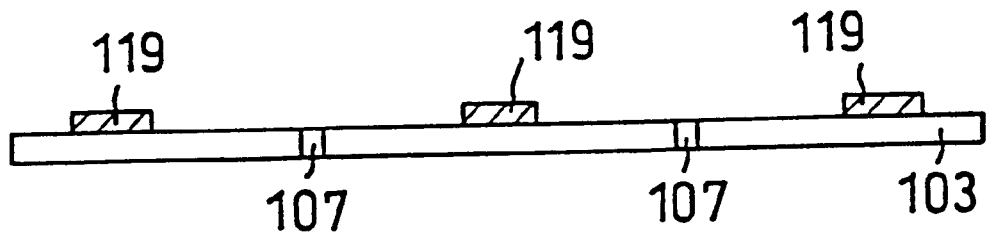
FIG. 8 is a cross-sectional view of various steps given in explanation of the process of forming a separating member employed in the reflective liquid crystal display device of the invention.

First of all, an insulating transparent substrate 103 is prepared constituted by glass having contact holes 107 that are filled with an electrically conducting substance and this substrate 103 is coated with a black insulating layer using the CVD method or spin coating method or the like; patterning is then performed to form black insulating layer pattern 119 (FIG. 8).

Figure 9:
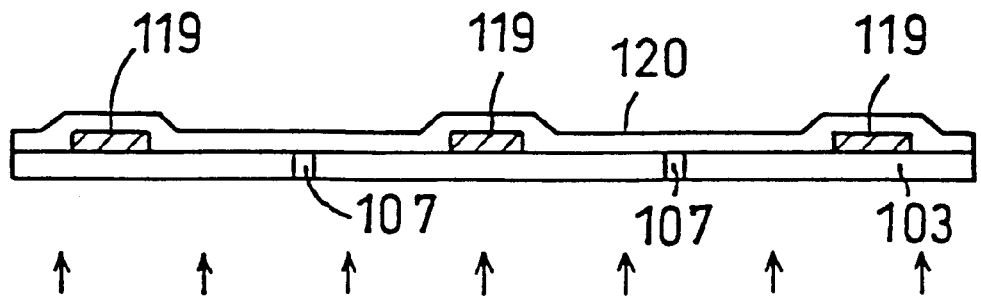
FIG. 9 is a cross-sectional view of various steps given in explanation of the process of forming a separating member employed in the reflective liquid crystal display device of the invention.

Next, a positive-type photoresist film 120 is applied on to substrate 103 on the side formed with the black insulating layer pattern 119, and exposure is performed from the other side (FIG.9).

Figure 10:
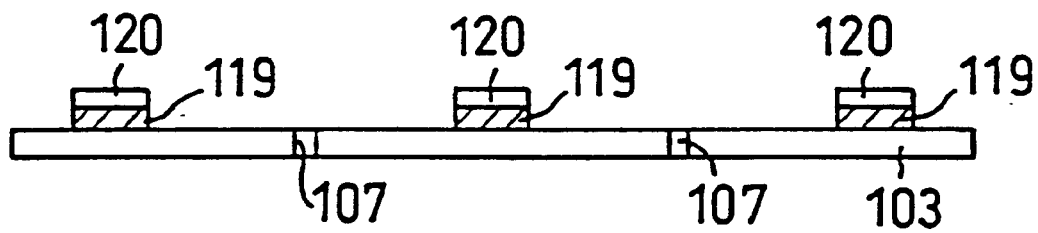
FIG. 10 is a cross-sectional view of various steps given in explanation of the process of forming a separating member employed in the reflective liquid crystal display device of the invention.

Next, photoresist film 120 is anti-clockwise only above black insulating layer pattern 119 by performing developing of the thus-exposed substrate 103 (FIG. 10).

Figure 11:
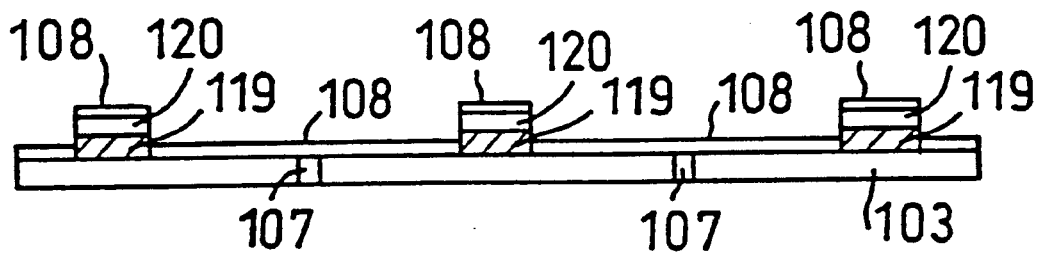
FIG. 11 is a cross-sectional view of various steps given in explanation of the process of forming a separating member employed in the reflective liquid crystal display device of the invention.

Next, a coating of a transparent elecrically conductive substance 108 in a thickness of about 100 nm, for example an ITO film, is applied by the sputtering method or the like (FIG. 11).

Figure 12:
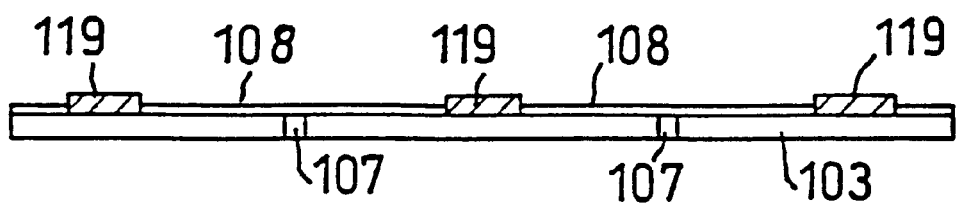
FIG. 12 is a cross-sectional view of various steps given in explanation of the process of forming a separating member employed in the reflective liquid crystal display device of the invention.

Next, black insulating layer pattern 119 and electrodes 108 are formed in self-aligned fashion (FIG. 12) by dissolving away the pattern of photoresist film 120 in this condition and thereby simultaneously removing the ITO film 108 on photoresist film 120 (FIG. 12).

Figure 13:
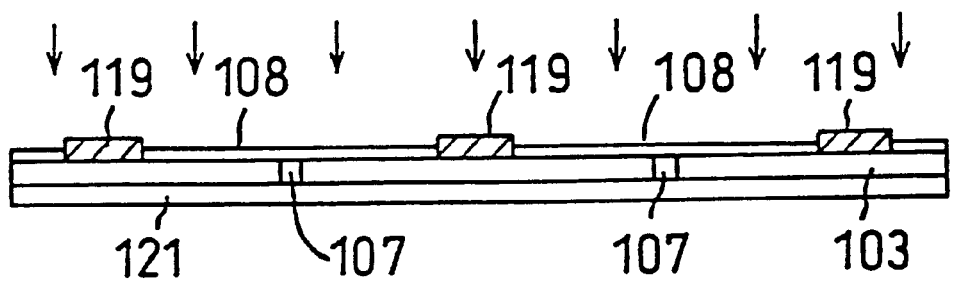
FIG. 13 is a cross-sectional view of various steps given in explanation of the process of forming a separating member employed in the reflective liquid crystal display device of the invention.

Next, a positive-type photoresist film 121 is applied on the opposite side to that where black insulating layer pattern 119 was formed on this substrate 103, and this is then exposed from the front surface (FIG. 13).

Figure 14:
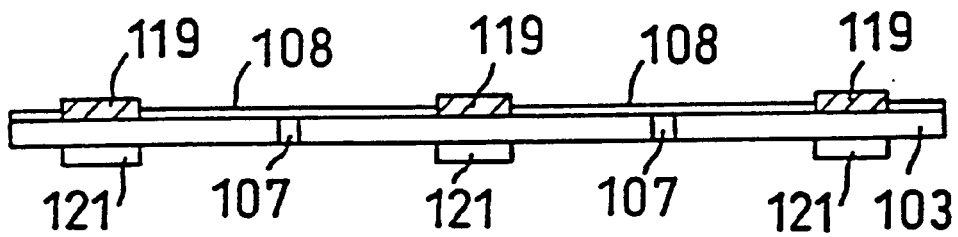
FIG. 14 is a cross-sectional view of various steps given in explanation of the process of forming a separating member employed in the reflective liquid crystal display device of the invention.

Next, development of this substrate is conducted and patterning of photoresist film 121 is performed (FIG. 14).

Figure 15:
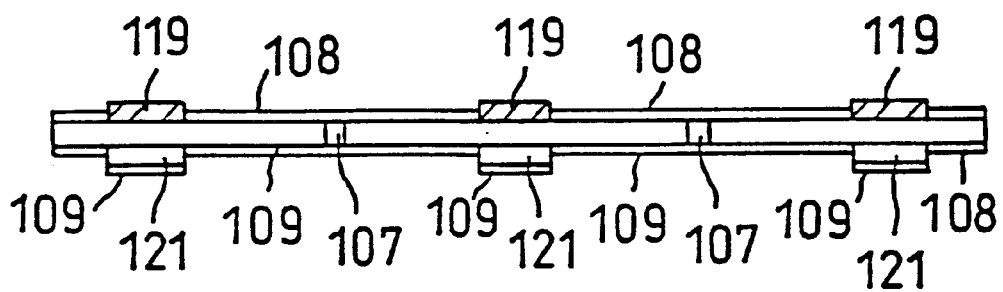
FIG. 15 is a cross-sectional view of various steps given in explanation of the process of forming a separating member employed in the reflective liquid crystal display device of the invention.

Next, by the sputtering method or the like, a transparent electrically conductive substance 109 for example an ITO film to constitute electrodes of thickness of the order of 100 nm is formed (FIG. 15).

Figure 16:
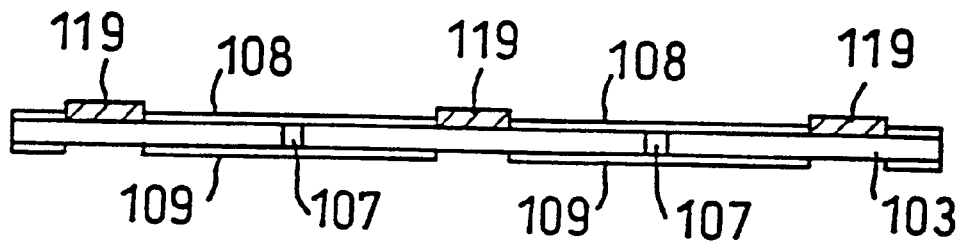
FIG. 16 is a cross-sectional view of various steps given in explanation of the process of forming a separating member employed in the reflective liquid crystal display device of the invention.

Next, by dissolving away the photoresist film 121 in this condition, the transparent electrically conductive substance 109 on photoresist film 121 is simultaneously removed, thereby forming black insulating layer pattern 119 and electrodes 109 in self-alignment condition (FIG. 16).

In this way, black insulating layer pattern 119 and intermediate electrodes 108, 109 consisting of transparent conductive substance can be formed in self-aligned fashion on the upper surface and lower surface of an insulating transparent substrate 103. In this process, the intermediate electrodes 108, 109 are both electrically connected by means of the contact holes 107 filled with conducting substance.

Figure 17:
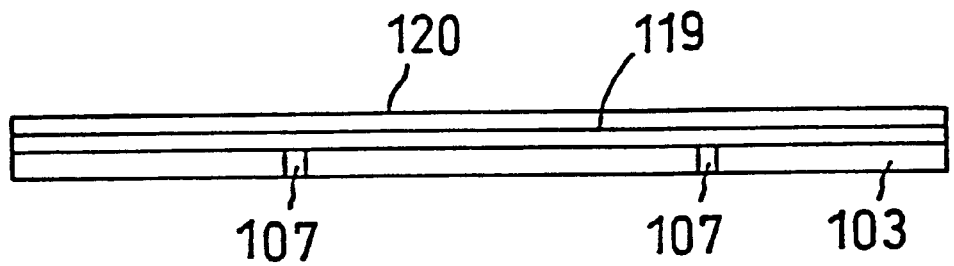
FIG. 17 is a cross-sectional view of various steps given in explanation of the process of forming a separating member employed in the reflective liquid crystal display device of the invention.
Figure 18:
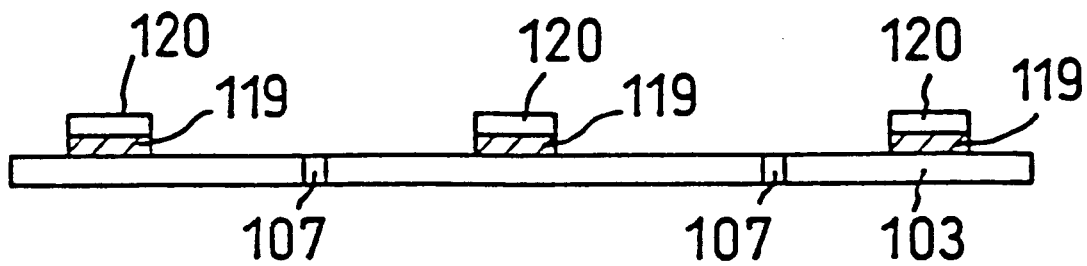
FIG. 18 is a cross-sectional view of various steps given in explanation of the process of forming a separating member employed in the reflective liquid crystal display device of the invention.

It should be noted that, as shown in FIG. 8 to FIG. 10, photoresist film pattern 120 is formed using black insulating layer pattern 119 as mask, but, as shown in FIG. 17 and FIG. 18, photoresist film 120 is applied after insulating conductive substrate 103 has been coated with black insulating layer 119 (FIG. 17). Next, photoresist film 120 is patterned using the ordinary PEP method. Black insulating film 119 is patterned (FIG. 18) using the pattern of this photoresist film 120 as mask. Subsequent steps may be performed in the same way as described above.

Although, in the method of forming a separating member described above, of the transparent electrode layer patterns 108, 109 that are formed on the upper surface and lower surface of insulating transparent substrate 103, the transparent electrode layer pattern on the side where black insulating layer pattern 119 was formed is formed first, there is no restriction to this, and the same structure could of course be obtained by starting the construction from the transparent electrode layer pattern on the opposite side to the side where black insulating layer pattern 119 was formed.

Thus, if the method described above is employed, the separating member provided with electrodes consisting of transparent electrically conductive substance on the upper surface and lower surface of the insulating transparent substrate can be formed with the black insulating layer pattern perfectly self-aligned between the electrodes.

As described above, by the provision of a separating member provided with through-holes between the first liquid crystal layer and the second liquid crystal layer, electrical connection can be effected between electrodes formed on both faces of the separating member, so the possibility of a voltage drop being produced is eliminated. The same benefits can also be obtained even if this separating member is formed of anisotropic electrically conductive film.

The present invention is able to provide a reflective liquid crystal display device having high reflectivity.

What is claimed is:

1. A reflective liquid crystal display device comprising:
   a substrate having a surface;
   a pixel electrode on the surface of the substrate;
   a first liquid crystal layer provided on the pixel electrode on the surface of the substrate;
   a second liquid crystal layer provided on the first liquid crystal layer;
   a counter electrode formed on the second liquid crystal layer; and
   a separating member provided between the first liquid crystal layer and the second liquid crystal layer,
   wherein the first and second liquid crystal layers comprise liquid crystal material having Bragg reflection in the same twist direction, and the separating member comprises an optical compensator and has anisotropic electrical conducting characteristics in thickness.

2. A reflective liquid crystal display device according to claim 1, wherein the second liquid crystal layer comprises liquid crystal material having a twist pitch p2 and the separating member offsets by about $\lambda'/2$ the phase of the ordinary optical component and extraordinary optical component of light of wavelength width $\Delta$ n'p2 ($\Delta$n' is the optical anisotropy of the liquid crystal material of the second liquid crystal layer) having a selected reflected wavelength center value $\lambda'$=n'p2 (n' is a mean refractive index of the liquid crystal material in the second liquid crystal layer) in the direction of propagation of the light.

3. A reflective type liquid crystal display device according to claim 1, wherein the separating member has a thickness of about 1 $\mu$m or less and is constituted of a material that can transmit light having a wavelength of about 400 nm to about 650 nm.

4. A reflective liquid crystal display device according to claim 1, wherein the first liquid crystal layer comprises chiral nematic liquid crystal material and the second liquid crystal layer comprises chiral nematic liquid crystal material and the first liquid crystal layer and the second liquid crystal layer reflecting a same direction circular wave.

5. A reflective liquid crystal display device according to claim 4, wherein the chiral nematic liquid crystal material is a mixed liquid crystal of nematic liquid crystal and chiral substance containing cholesteric liquid crystal and light of wavelength about 350 nm to about 650 nm is reflected by the twisted structure of the liquid crystal.

6. A reflective liquid crystal display device according to claim 4, wherein the twist direction of the chiral nematic liquid crystal material constituting the first liquid crystal layer and the twist direction of the chiral nematic liquid crystal material constituting the second liquid crystal layer are the same and a phase compensation layer changes the circular wave passed through the second liquid crystal layer to the other direction.

7. A reflective liquid crystal display device according to claim 6 wherein the phase compensating layer has optical film which offsets by approximately a half-wavelength $\lambda'/2$ the phase of the ordinary component and extraordinary component of light of wavelength width $\Delta$n'p (where $\Delta$n' is the refractive index anisotropy of the liquid crystal material of the second layer and p is the twist pitch of the liquid crystal material of the second layer) having Bragg reflection wavelength center value $\lambda'$ of the chiral nematic liquid crystal material constituting the second liquid crystal layer.

8. A reflective liquid crystal display device according to claim 4, wherein a difference $\Delta\lambda$ of the selected reflecting central wavelength $\lambda 1$ of the chiral nematic liquid crystal material of the first liquid crystal layer and the selected reflecting central wavelength $\lambda 2$ of the chiral nematic liquid crystal material of the second liquid crystal layer satisfies: 30 nm<$\Delta\lambda$<100 nm.

* * * * *